Figure 1:
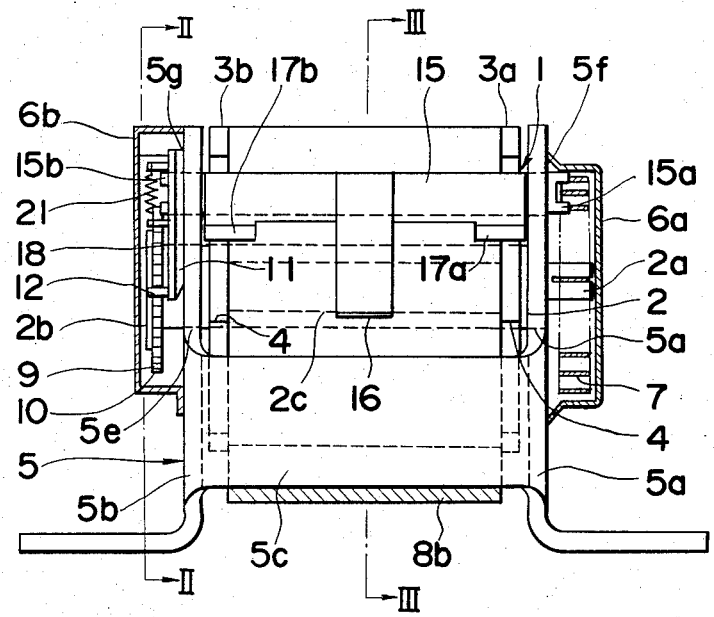

United States Patent [19]
Hayashi

[11] 3,809,332
[45] May 7, 1974

[54] PASSENGER VEHICLE SAFETY BELT LOCKING DEVICE

[75] Inventor: Yoshihiro Hayashi, Toyota, Japan

[73] Assignee: Kabushiki Kaisha Tokai Rika Denki Seisakusho, Aichi-ken, Japan

[22] Filed: July 13, 1972

[21] Appl. No.: 271,392

[30] Foreign Application Priority Data
July 13, 1971  Japan.............................. 46-61574

[52] U.S. Cl. ............................................. 242/107.4
[51] Int. Cl...................... A62b 35/00, B65h 63/00
[58] Field of Search ...... 242/107.4, 107 R, 107.5 B, 242/107.2, 107.3; 297/385, 388; 280/150.5 B; 188/82.4, 82.7

[56] References Cited
UNITED STATES PATENTS
3,598,336  8/1971  Frost.............................. 242/107.4
3,635,420  1/1972  Romanzi.......................... 242/107.4
3,632,058  1/1972  Stoffel.............................. 242/107.4
3,425,645  2/1969  Board et al. ....................... 242/107.2

Primary Examiner—John W. Huckert
Assistant Examiner—Jon W. Henry
Attorney, Agent, or Firm—Craig and Antonelli

[57] ABSTRACT

A passenger vehicle safety belt locking device which comprises a reel having ratchet wheels for winding a belt, a bar member having a clutch plate and pawls for detecting the winding condition of the belt, a tongued disc shiftable to detachably contact the clutch plate, and a jumping cam operating the tongued disc so as to either engage or disengage with the clutch plate with respect to the direction of rotation of the shaft in order to permit either engagement or disengagement of the pawls with the ratchet wheels, whereby the belt can freely unwind from the shaft while the loose belt can automatically wind back onto the shaft.

8 Claims, 10 Drawing Figures

PASSENGER VEHICLE SAFETY BELT LOCKING DEVICE

The present invention relates to a passenger vehicle safety belt locking device, whereby a belt is drawn out from the locking device fixed securely to the roof, above the window on the outside of a passenger passed over the passenger's body and then locked by means of a clasp, clip, or other conventional chucking means detachably mounted on the floor by the interior side of the passenger's seat.

Usually, the locking device of the kind above referred to is necessary to provide at one end of the seat belt in order to lock the belt at the position for fastening the passenger on the seat in the accident of the vehicle.

In the conventional locking device of the kind above referred to, the belt pulled out from the locking device at one time cannot be wound back to the locking device any more, since the locking device is so designed to lock the belt at the same time the pulling operation thereof is stopped even if a passenger is pulled out the belt longer than required, whereby the belt often permits loose fastening of the passenger, so that the passenger could not be safety restrained on the seat in a vehicle.

Accordingly, an essential object of the present invention is to provide a passenger vehicle safety belt locking device of the kind above referred to which substantially eliminates the above mentioned disadvantages inherent in the prior art device of the same kind.

Another important object of the present invention is to provide a passenger vehicle safety belt locking device of the kind above referred to wherein an improvement is made to ensure a reliable fastening of the passenger by means of the safety belt whose length is always entirely fitted to the different passengers of various sizes since the unnecessary length of the belt is automatically wound up within the locking device after the belt is pulled out from the locking device.

A further object of the present invention is to provide a passenger vehicle safety belt locking device of the kind above referred to which is easy in operation with a trouble free manner, which is simple and compact in construction and which is reliable and durable in function.

The locking device for the safety belt according to the present invention is so designed that, a belt for fastening a passenger sitting on the seat in a vehicle which before use is wound in completely in a locking device which is fixedly attached to the inside of the roof frame above and on the outside side of the passenger, and when used is first pulled out from the locking device attached to the roof frame and passed over the passenger's body and then locked in a chucking means which is detachably attached to the floor of the vehicle by the passenger's seat on the inside side, after which any length of belt in excess of that necessary for passing over the passenger's body is automatically wound back and the belt is then locked and prevented from being pulled out any further even in the case of sudden braking of the vehicle thus ensuring that the passenger is firmly held in all situations until the belt is released from the locking device detachably mounted on the floor by the passenger's seat.

Furthermore, according to the present invention, there is provided a passenger vehicle safety belt locking device essentially comprising a belt winding shaft driven by a spring, at one end of which a jumping cam is rigidly mounted and a tongued disc is loosely mounted, and in the central portion of which are fixedly mounted two ratchet wheels, and a bar provided with pawls to engage the said ratchet wheels on the said belt winding shaft and having rigidly mounted at one end a clutch plate, wherein the various parts cooperatively function together to automatically wind back loose belt and firmly lock the belt when the belt has been unwound passed around a passenger's body and locked in the conventional locking device.

Figure 2:
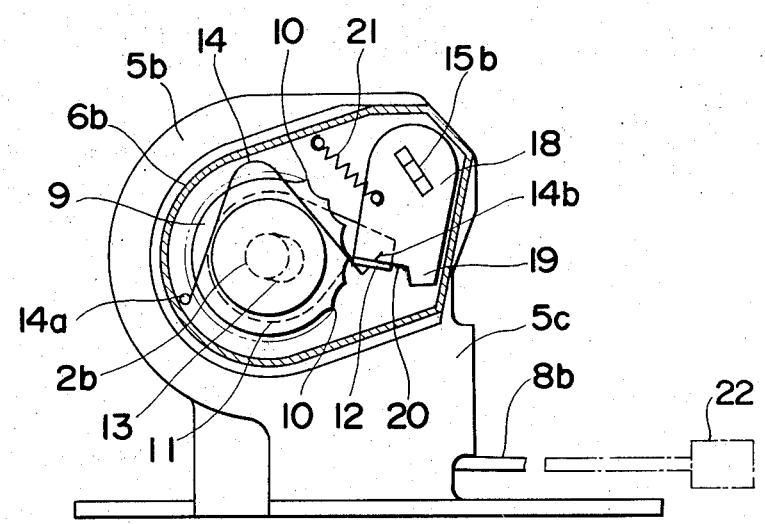
Figure 3:
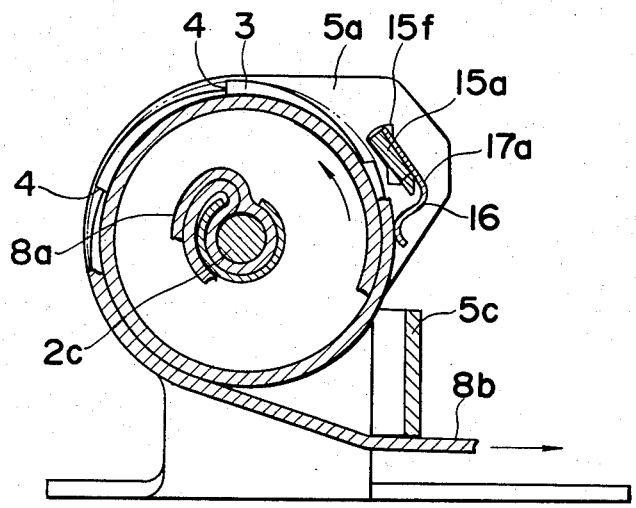
Figure 4A:
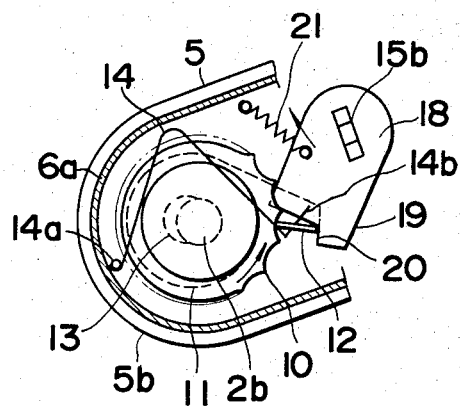
Figure 4B:
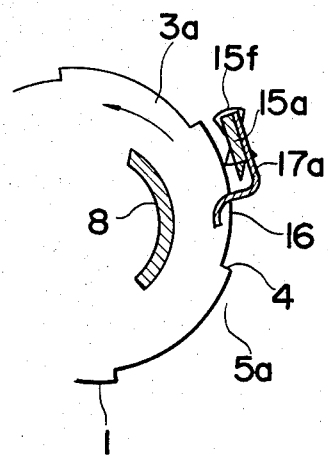
Figure 5A:
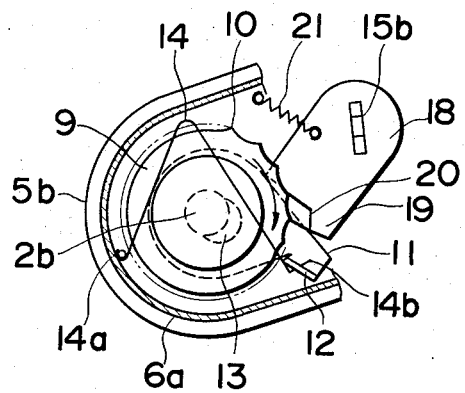
Figure 5B:
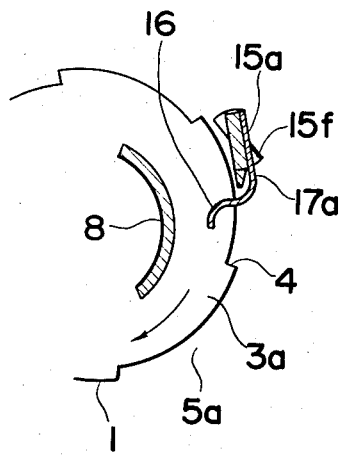
Figure 6A:
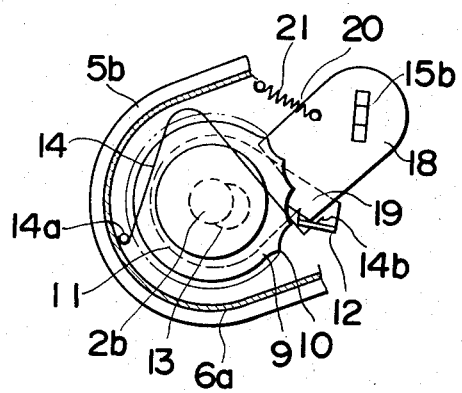
Figure 6B:
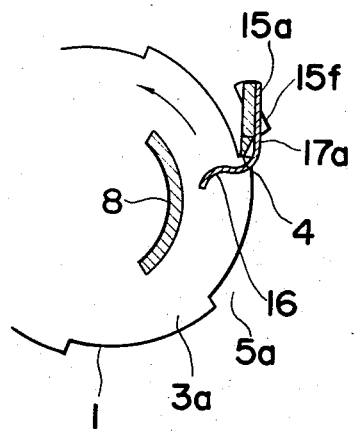
Figure 7:
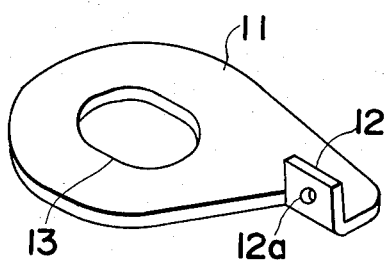

The present invention will become apparent from the following full description of the present invention taken in conjunction with preferred embodiments thereof with reference to the accompanying drawing in which:

FIG. 1 is a front view, partially cut away, of the loking device in accordance with the preferred embodiment of the present invention, FIG. 2 is a sectional side view taken along the line II—II of FIG. 1, FIG. 3 is a sectional side view taken along the line III—III of FIG. 1, FIGS. 2 and 3 illustrating the condition when the belt is fully wound, FIGS. 4a, 5a and 6a are respectively sectional views showing the functioning parts illustrated in FIG. 2, and FIGS. 4b, 5b and 6b are respectively sectional views showing the functioning parts illustrated in FIG. 3, FIGS. 4a and 4b illustrating the condition at the time the belt is being pulled out, FIGS. 5a and 5b illustrating the condition at the moment the belt stops being pulled out, and FIGS. 6a and 6b illustrating the condition when the belt is locked, and FIG. 7 is a perspective view of the tongued disc 11 thereof.

Before the description of the present invention proceeds it is to be noted that like parts are designated by like numerals through the several views of the accompaying drawings.

The belt 8 for fastening the passenger sitting on seat in the vehicle is usually provided at its one end a locking device 1 and at the other end a detachable chucking means 22.

The locking device 1 above and to the outside of the passenger is mounted on a frame 5, the frame 5 consisting of two parallel flanges 5a and 5b, to which are firmly attached outside at right angles two further flanges provided with holes through which bolts can be inserted to secure the frame 5 to the inside of the roof of the vehicle and between which there is a cross-piece 5c near the flanges for bolts, giving the whole frame a rigid construction, there also being a spaced below the cross-piece 5c through which the belt 8b can be withdrawn. The flanges 5a and 5b have respectively round holes 5d and 5e which are located approximately centrally and are for the purpose of receiving a winding shaft 2 which projects beyond the flanges 5a and 5b to form two projecting portions 2a and 2b, and hour-glass shaped holes 5f and 5g located above the holes 5d and 5e, respectively, and which are for the purpose of receiving a flat rectangular bar 15 which projects beyond the flanges 5a and 5b to form two projecting portions 15a and 15b, respectively, and which posseses two pawl pieces 17a and 17b located on the central portion near the flanges 5a and 5b, respectively, and a spring plate 16 located between the pawl pieces 17a and 17b. The shaft 2 is rotatably mounted in the holes 5d and 5e and passes through the flanges 5a and 5b to form two projecting portions 2a and 2b respectively, while its central portion 2c is provided with means, such as a clip etc., for fixedly securing one end 8a of the belt 8 to be wound, and at the outer ends of the winding shaft central portion 2c, inside the flanges 5a and 5b respectively, are rigidly mounted a pair or ratchet wheels 3a and 3b whose toothed portions 4 face the direction of rotation for unwinding of the belt 8. The two ratchet wheels 3a and 3b are the same size and shape and the toothed portions on one wheel are aligned with those on the other and can be detachably engaged with the corresponding pawl piece 17a or 17b of the flat rectangular bar 15. The shaft 2 and two ratchet wheels 3a and 3b are formed as a reel for winding the belt 8 thereon. The bar projecting portion 15a and the winding shaft projecting portion 2a are covered by a single cap 6a to the inside of which is firmly attached a coil spring 7 which is also firmly attached to the end of the winding shaft projection portion 2a, the tensile force of said spring 7 acting in the direction of rotation for winding in the belt and being sufficiently great to cause the winding shaft 2 to completely wind in the belt unless otherwise restrained, thus any unwinding or withdrawing of the belt must be done against the force of this spring 7.

The flat rectangular bar 15 is not rigidly connected to the flanges 5a and 5b but it can rotate through a certain angle, pivoting on the waist portions of the hourglass holes 5f and 5g and at its centre portion between the flanges 5a and 5b is connected with the spring plate 16 whose other end is normally in contact with the belt 8, the spring plate 16 being raised or lowered as the total diameter of the winding shaft and the wound-in belt increases or diminishes corresponding to the amount of belt 8 wound in. The pawl pieces 17a and 17b of the bar 15 serve to engage with the toothed portions 4 of the ratchet wheels 3a and 3b mounted on the winding shaft 2, to perform a locking action, as will be described herein below. On the outer end of the winding shaft projecting portion 2b, projecting beyond the flange 5b, is rigidly mounted a jumping cam 9, formed by a disc whose edge consists of a continuous series of concave indentations 10, said jumping cam 9 rotating with the winding shaft 2. Nearer the flange 5b on the winding shaft projecting portion 2b is loosely mounted a tongued disc 11, from the tongued portion of which projects at a right angle a contact portion 12 in which there is a small hole 12a. The disc 11 is also being provided with a hole 13 through which the shaft 2 passes. The hole 13 is elongated having a long diameter and a short diameter with the disc 11 being able to change its position relative to the shaft 2 by sliding in the direction of the long diameter. The contact portion 12 of the tongued disc 11 is for engaging the jumping cam 9 from which it is normally held disengaged by the force of an expansion spring 14 which has one end 14b inserted in the small hole 12a and the other end 14a attached firmly to the inside of a cap 6b covering the projections 2b and 15b and mounted on the outside of flange 5b. On the projecting portion 15b of the bar 15 is rigidly mounted a clutch plate 18 whose clutch portion 19 is at the end 20 nearer the contact portion 12 of the tongued disc 11, the mounting of the clutch plate 18 on the bar 15 being rigid, the clutch plate 18 and the bar 15 move together. A spring 21, which has one end secured to the flange 5b inside of the cap 6b and the other end secured to the clutch plate 18, exerts a constant pressure to the same direction on the clutch plate 18, which is positioned between the jumping cam 9, with which it does not come into direct contact and the tongued disc 11, the clutch plate 18 together with the projecting portion 15b being urged in pulled to the same direction as the direction of rotation of the shaft 2 for winding the belt 8 by the compressing force of the spring 21. If viewed from the flange 5b side, the clutch plate 18 is turned in the clockwise direction by the spring 21, the clutch portion 19 pushes the contact portion 12 into a position where it contacts the jumping cam 9, while if it is turned in the counterclockwise direction against the spring 21 the contact portion 12 is not pushed into contact with the jumping cam 9.

The manner of use is that the belt is pulled out from the locking device 1 attached rigidly to the roof above in the vehicle and on the outside of the passenger, passed over the passenger, then locked in the chucking means detachably attached to the floor of the vehicle by the inside of the passenger's seat.

Before the belt 8 is pulled out it is held completely wound in, as illustrated in FIGS. 2 and 3, by the force of the coil spring 7 attached to the winding shaft projecting portion 2a and the inside of the cap 6a. In this situation the total diameter of the winding shaft 2 and the wound-in belt 8 is comparatively large, and the spring plate 16 connected to the bar 15 is pushed up and the bar 15 turns the clutch plate 18 in opposition to the spring 21 which tends to pull the clutch plate 18 in the opposite direction to bring it into connection with the jumping cam 9 through the contact portion 12. Therefore, in this situation, since the pawl pieces 17a and 17b on the bar 15 are held in a position in which they cannot engage with corresponding toothed portions 4 of the ratchet wheels 3a and 3b, and although the contact portion 12 of the tongued disc 11 is in contact with the clutch plate 18 it is not in contact with the jumping cam 9, the jumping cam 9 and the winding shaft 2 are free to rotate and there is no engagement of any parts to prevent the belt from being pulled out and the necessary amount of belt for securing the person of the passenger can be pulled out without any hindrance.

However, after a certain amount of belt has been pulled out the total diameter of the winding shaft 2 and the wound belt become less and the spring plate 16 is lowered, as shown FIGS. 4a and 4b. In this condition, through the force of the spring 21 acting on the clutch plate 18 and therefore on the bar 15, the bar 15 is turned towards a position where its pawls pieces 17a and 17b can contact the ratchet wheels 3a and 3b but the pawl pieces 17a and 17b are prevented from actually contacting the toothed portions 4 of the ratchet wheels 3a and 3b since at the same time as the clutch plate 18 turns the bar 15 in the direction in which the pawl pieces 17a and 17b come toward a position where they can engage the ratchet wheels 3a and 3b it also pushes against the contact portion 12 on the tongued disc 11, which can slide along the long diameter of the hole 13 to change its position relative to the shaft 2 on which it is loosely mounted, pushing the said contact portion 12 into contact with the jumping cam 9, which being rigidly attached to the winding shaft 2, rotates in the direction for unwinding the belt, and while rotating in this direction turns in the direction in which it reinforces the force of the spring 14 and pushes the contact portion 12 into a position where it is kept in contact with the clutch portion 20 of the clutch plate 18. And the proportions of the various functioning parts are made such that while the contact portion 12 is held in contact with the clutch plate 18, the bar 15 cannot turn to a position where its pawl pieces 17a and 17b can engage the toothed portions 4 of the ratchet wheels 3a and 3b.

When however, a sufficient amount of belt for securing the person of the passenger has been wound out and one end lock locked in the locking by the chucking means on the floor by the passenger's seat, and the passenger no longer pulls on the belt, the tensile force of the spring attached to the inside of the cap 7 and to the end of the projecting winding shaft projecting portion 2a is unopposed and winds in any spare, loose length of belt. As now the winding shaft 2 rotates in the direction for winding in the belt the jumping cam 9 which is rigidly attached to the winding shaft 2 must also turn in the same direction and when it turns in this direction it overcomes the force of the expansion spring 14 and pushes the contact portion 12 out of contact with the clutch plate 18, as shown in FIGS. 5a and 5b, thus removing the restraining force in opposition to the spring 21, which now pulls the clutch plate in a clockwise direction as viewed from the 5b side of the locking device, and as the clutch plate turns in this direction the bar 15 rigidly attached to it also turns in the same direction, with the result that the pawl pieces 17a and 17b on the bar 15 can engage the ratchet wheels 3a and 3b, as shown in FIGS. 6a and 6b. The pawl pieces 17a and 17b slide over the backs of the toothed portions 4 of the ratchet wheels 3 a and 3b while the belt is being wound in but engage the toothed portions 4 if the ratchet wheels are turned in the direction for unwinding the belt, and since the ratchet wheels are rigidly attached to the winding shaft 2, the latter is effectively blocked from rotating any further in the direction for unwinding the belt, which is firmly locked and prevented from unwinding further even in the case of sudden braking of the vehicle for some reason or other, and hence the user of the belt is held firmly and safely and the object of the present invention is achieved.

In this condition, for unlocking the belt 8 from the locking device 1, it is necessary to release the chucking means 22 provided at the other end of the belt 8 from the floor of the vehicle so that the belt 8 is wound up again within the locking device 1 by the tensile force of the spring 7 under the disengagement between the ratchet wheel 3a and 3b and the pawl pieces 17a and 17b.

Accordingly, the correct, reliable action of the safety belt for fastening which is suitable for the physical construction, etc. of each passenger can be assured by a simple construction of the locking device of the present invention.

In view of the fact that various changes and modifications of the present invention are apparatus to those skilled in the art, they should be construed as included in the scope of the present invention unless otherwise departing from the true spirit and scope of the present invention.

I claim:

1. A passenger vehicle safety belt locking device comprising: a vehicle safety belt; a frame; a reel rotatably supported in said frame, said reel including a shaft having secured thereto one end of the safety belt; spring means provided on said shaft for rotating said shaft to wind the safety belt; ratchet wheels rigidly mounted on each side of said shaft, said ratchet wheels being provided with toothed portion facing the direction of rotation of the shaft for unwinding of the safety belt; a bar member rotatably disposed in said frame; said bar member being provided with two pawls engageable with said toothed portions of said ratchet wheels; safety belt follower means attached to said bar member to hold said pawls out of the paths of rotation of said ratchet wheels unitl a predetermined length of safety belt has been protracted; bias means normally urging said safety belt follower means into contact with the safety belt wound on said shaft; a clutch plate provided on an end of said bar member, said clutch plate being provided with a clutch portion; a jumping cam rigidly mounted on an end of said shaft, said jumping cam being provided with an edge portion consisting of a continuous series of concave indentations; and a tongued disc; means for shiftably mounting said tongued disc on said shaft; said tongued disc being provided with a contact portion operatively connected with both said clutch portion and said indentations, said tongued disc being engaged with said clutch portion when said jumping cam rotates in the direction for unwinding the safety belt, said jumping cam disengaging said tongued disc from said clutch portion when said jumping cam rotates in the direction for winding the safety belt thereby permitting said bar member to rotate causing said pawls to engage with said tooth portions of said ratchet wheels, if said safety belt follower means is out of contact with the safety belt due to the unwinding thereof from said shaft.

2. A safety belt according to claim 1, wherein said bias means are connected to said clutch plate.

3. A safety belt according to claim 2, wherein said last mentioned means includes a spring one end of which is secured to a portion of said frame and the other end of which is secured to said clutch plate.

4. A safety belt according to claim 1, wherein means are provided for normally biasing said contact portion out of engagement with said jumping cam and said contact portion is provided with an aperture means cooperating with said biasing means.

5. A safety belt according to claim 4, wherein said last mentioned means includes an expansion spring one end of which is disposed in said aperture means and the other end of which is disposed on a cap portion provided on said frame.

6. A safety belt according to claim 1, wherein said safety belt follower means includes a spring plate.

7. A safety belt according to claim 1, wherein said frame is provided with hour-glass apertures in which are disposed the respective ends of said bar member.

8. A safety belt according to claim 1, wherein said means for shiftably mounting said tongued disc includes an elongated hole and said tongued disc is shiftable in the direction of the long diameter of said hole.

* * * * *